United States Patent
Maurer et al.

(10) Patent No.: US 11,555,685 B2
(45) Date of Patent: Jan. 17, 2023

(54) DEVICE AND METHOD FOR DETECTING A LAYER THICKNESS OF A COATED COMPONENT

(71) Applicant: Robert Bosch GmbH, Stuttgart (DE)

(72) Inventors: Christoph Maurer, Heidenheim (DE); Wolfgang Huschenhoefer, Asslar (DE); Marian Willeke, Hagen (DE)

(73) Assignee: Robert Bosch GmbH, Stuttgart (DE)

( * ) Notice: Subject to any disclaimer, the term of this patent is extended or adjusted under 35 U.S.C. 154(b) by 332 days.

(21) Appl. No.: 16/608,042

(22) PCT Filed: May 4, 2018

(86) PCT No.: PCT/EP2018/061460
§ 371 (c)(1),
(2) Date: Oct. 24, 2019

(87) PCT Pub. No.: WO2018/206416
PCT Pub. Date: Nov. 15, 2018

(65) Prior Publication Data
US 2020/0049480 A1    Feb. 13, 2020

(30) Foreign Application Priority Data

May 10, 2017   (DE) .................... 10 2017 207 841.3

(51) Int. Cl.
*G01B 7/06*   (2006.01)
*G01B 5/00*   (2006.01)

(52) U.S. Cl.
CPC ........... *G01B 7/105* (2013.01); *G01B 5/0028* (2013.01)

(58) Field of Classification Search
CPC ........ G01B 7/06; G01B 7/105; G01B 5/0028; G01B 5/066; G01B 7/016; G01B 5/012; G01B 5/016; G01B 5/0016; F16C 39/063
See application file for complete search history.

(56) References Cited

U.S. PATENT DOCUMENTS

| 4,343,092 A | 8/1982 | Wahl et al. |
| 2010/0031523 A1* | 2/2010 | Clark ....................... G01B 3/20 33/610 |

(Continued)

FOREIGN PATENT DOCUMENTS

| CN | 101839681 A | 9/2010 |
| CN | 201983737 U | 9/2011 |

(Continued)

OTHER PUBLICATIONS

International Search Report corresponding to PCT Application No. PCT/EP2018/061460, dated Jun. 22, 2018 German and English language document) (5 pages).

*Primary Examiner* — Lee E Rodak
*Assistant Examiner* — Brent J Andrews
(74) *Attorney, Agent, or Firm* — Maginot, Moore & Beck LLP

(57) ABSTRACT

A device for detecting a layer thickness of a coated component, particularly a brake disc for a disc brake of a motor vehicle, includes at least one holding device and a guiding device. The holding device has a bearing surface for the component. The guiding device is configured to hold and guide a sensor in order to measure the layer thickness. The sensor is configured to be moved by the guiding device along a vertical axis and pivot about a first axis of rotation that is oriented horizontally. The sensor is further configured to be moved by the guiding device along a horizontal axis.

13 Claims, 4 Drawing Sheets

(56) References Cited

U.S. PATENT DOCUMENTS

2013/0111774 A1* 5/2013 McMurtry ............. G01B 7/016
                                                  33/503
2014/0367266 A1* 12/2014 Budiarto ............ G01R 31/2656
                                                  205/84

FOREIGN PATENT DOCUMENTS

| CN | 103003658 A | 3/2013 |
| CN | 104833299 A | 8/2015 |
| DE | 10 2010 011 633 A1 | 10/2010 |
| EP | 0 503 245 A1 | 9/1992 |
| EP | 2 905 573 A1 | 8/2015 |
| JP | S63-285407 A | 11/1988 |
| JP | 2002-250378 A | 9/2002 |
| JP | 2007-17292 A | 1/2007 |
| JP | 2007-071726 A | 3/2007 |
| JP | 2014-502338 A | 1/2014 |
| JP | 2015-169641 A | 9/2015 |
| WO | 2016/051147 A1 | 4/2016 |

* cited by examiner

DEVICE AND METHOD FOR DETECTING A LAYER THICKNESS OF A COATED COMPONENT

This application is a 35 U.S.C. § 371 National Stage Application of PCT/EP2018/061460, filed on May 4, 2018, which claims the benefit of priority to Serial No. DE 10 2017 207 841.3, filed on May 10, 2017 in Germany, the disclosures of which are incorporated herein by reference in their entirety.

BACKGROUND

The disclosure relates to a device for detecting the layer thickness of a coated component, in particular a brake disk for a disk brake of a motor vehicle, comprising at least one holding device having a bearing surface for the component and a guiding device for holding and guiding a sensor for measuring the layer thickness, the sensor being movable by the guiding device along a vertical axis and pivotable about a first axis of rotation.

In addition, the disclosure relates to a method for operating the device.

PRIOR ART

Devices of the aforementioned kind are known from the prior art. Hence, the first publication of patent application DE 10 2010 011 633 A1 discloses a measuring station for receiving at least one measuring probe designed to detect a layer thickness of a coated component. The measuring station in this case comprises a measuring table acting as the bearing surface for the component and also a housing for holding and guiding the measuring probe. The measuring probe in this case is mounted on the housing in such a manner that it can be moved along a vertical axis and pivoted about an axis of rotation oriented parallel to the vertical axis.

SUMMARY

According to the disclosure it is provided that the sensor can also be moved by the guiding device along a horizontal axis and that the axis of rotation is horizontally oriented. On the one hand, this offers the advantage that the sensor has a translational degree of freedom in the horizontal direction in addition to a translational degree of freedom in the vertical direction. The additional translational degree of freedom means that the movement possibilities of the sensor are increased, so that additional positions, in particular coating thickness measuring points, can be reached by the sensor in the horizontal direction on a surface of the component. On the other hand, the horizontal orientation of the axis of rotation offers the advantage that the sensor is pivotable in such a manner that an upper side, a lower side opposite the upper side and/or at least one side wall, for example an outer and/or inner casing wall, of the component or the brake disk can easily be reached by the sensor. Rotating the component, for example rotating the component through 180°, so that initially the upper side and then the lower side is arranged opposite the sensor, is not therefore necessary. The upper side, lower side and/or side wall can therefore be reached with minimal effort with a single set-up of the component and can therefore be detected for a layer thickness measurement.

According to a preferred development of the disclosure, it is provided that the bearing surface of the holding device is rotatable about a second axis of rotation which is oriented vertically. The advantage in this case is that the combination of the movability of the sensor in a horizontal direction, the pivotability of the sensor about the first axis of rotation and the rotatability of the bearing surface about the second axis of rotation the layer thickness can be measured particularly easily at each position or each point on the surface of the component. The layer thickness can therefore be measured with a single set-up of the component with minimal measurement and space being required in each position. This produces both a particularly efficient measuring method and also a particularly compact configuration or configurability of the device because the component is only arranged rotatably and therefore in a particularly stationary manner on the bearing surface.

It is preferably provided that the guiding device has one or multiple controllable actuators for moving and/or turning the sensor. The advantage in this case is that a movement and/or rotation, in other words a positioning of the sensor, can be carried out automatically and therefore particularly accurately. In addition, it is therefore possible for the sensor to be placed on the surface of the component for a layer thickness measurement using a predefinable, particularly non-critical, contact force. It is preferably provided that both contact and also non-contact layer thickness measurements are carried out. The actuator is preferably an electromotive actuator. For control purposes, the actuator is preferably electrically connected to a control unit, in particular a control unit of the device. The control unit preferably has a data storage unit in which predefinable measuring positions or coordinates of measuring positions are stored and which are conveyed to the actuators, in order to position the sensor in accordance with the coordinates. Positioning or determination of the dimensions of the component or brake disk preferably takes place prior to a layer thickness measurement, so that the layer thickness measurement can then be reliably carried out.

The guiding device preferably has at least one guide rail which defines the horizontal axis. This offers the advantage that precise linear guidance of the guiding device in the horizontal direction is guaranteed. The guide rail is preferably made of a metal. In addition, it is preferably provided that the guiding mechanism has a further guide rail which defines the vertical axis. This is preferably configured so that the sensor is guided accurately in a vertical direction.

It is particularly preferably provided that the holding device has at least one controllable actuator for rotating the bearing surface. The advantage of this is that the rotation of the bearing surface can also be performed automatically and therefore particularly accurately. In particular, the combination of the automatic positionability of the sensor and the automatic rotation of the bearing surface guarantees that a particularly reliable, repeatable and completely automated layer thickness measurement can be carried out. This firstly minimizes the measuring duration and user influence because there is no need for manual positioning and/or rotation of the bearing surface by a user. On the other hand, automation means that savings can be made on costs, in particular staffing costs. The actuator for rotating the bearing surface is preferably an electromotive actuator. It is preferably provided that the actuator for rotating the bearing surface is connected for control purposes to a control unit, preferably to the control unit designed to move and/or rotate the sensor, in particular connected in an electrical or signaling manner.

According to a development of the disclosure, it is provided that the sensor is configured as a magnetic inductive measuring probe or as an eddy-current measuring probe. The advantage of this is that the layer thickness can be measured particularly accurately. The magnetic inductive measuring probe is used, for example, in order to detect a layer thickness of a non-magnetic layer material, for example zinc or polymer-based paint, on a magnetizable component, for example iron. In this case, the inductive measuring probe, in particular a measuring head of the measuring probe, is placed on the surface of the component. A magnetic field is produced in the inductive measuring probe by an electric current, the field strength of which is dependent on the coating, in particular the material of the coating and/or a thickness of the coating. The measuring signal detected by the measuring probe depending on the measured field strength is then preferably conveyed to the control unit or the data storage unit which preferably determines a layer thickness from the measuring signal detected by means of a measuring signal layer thickness characteristic curve. The eddy-current measuring probe is used, for example, to detect a layer thickness of a non-magnetic coating material on an electrically conductive non-ferrous metal.

The sensor is preferably arranged at a free end of a guiding arm arranged coaxially to the first axis of rotation. The advantage of this is that the sensor can be moved by the guiding arm along the vertical axis of the guiding device in a particularly accurate manner. The guiding arm is preferably guided in a movable or displaceable manner at one end on the guiding device, particularly on the other guide rail which defines the vertical axis. It is preferably provided that the sensor is held particularly detachably by a sensor mount, wherein the sensor mount is preferably arranged rotatably on the guiding arm, in particular on the free end of the guiding arm. The guiding arm is preferably configured as a bracket.

The sensor is preferably arranged at the free end of the guiding arm in such a manner that its measuring direction is oriented at least substantially perpendicularly to the first axis of rotation. The advantage of this is that the sensor, particularly a measuring head or a sensitive surface of the sensor, can be placed particularly accurately on the surface of the component. In particular, the sensor can be placed on the component in such a manner that the setting angle between the sensor and the surface is 90°.

The method according to the disclosure for operating a device for detection of the layer thickness of a coated component, in particular a brake disk for a disk brake of a motor vehicle, is characterized by the fact that a component is arranged on a bearing surface of a holding device and a sensor for layer thickness measurement is moved along a vertical axis and pivoted about a first axis of rotation by a guiding device which is configured to hold and guide the sensor. Furthermore, it is provided according to the disclosure that the sensor is also moved along a horizontal axis by the guiding device and that the axis of rotation is oriented horizontally. The advantages already mentioned thereby result. Further advantages and preferred features result, in particular, from what has been previously described and also from the claims.

BRIEF DESCRIPTION OF THE DRAWINGS

The disclosure is to be explained in greater detail below with the help of the figures. In the figures

DETAILED DESCRIPTION

Figure 1:
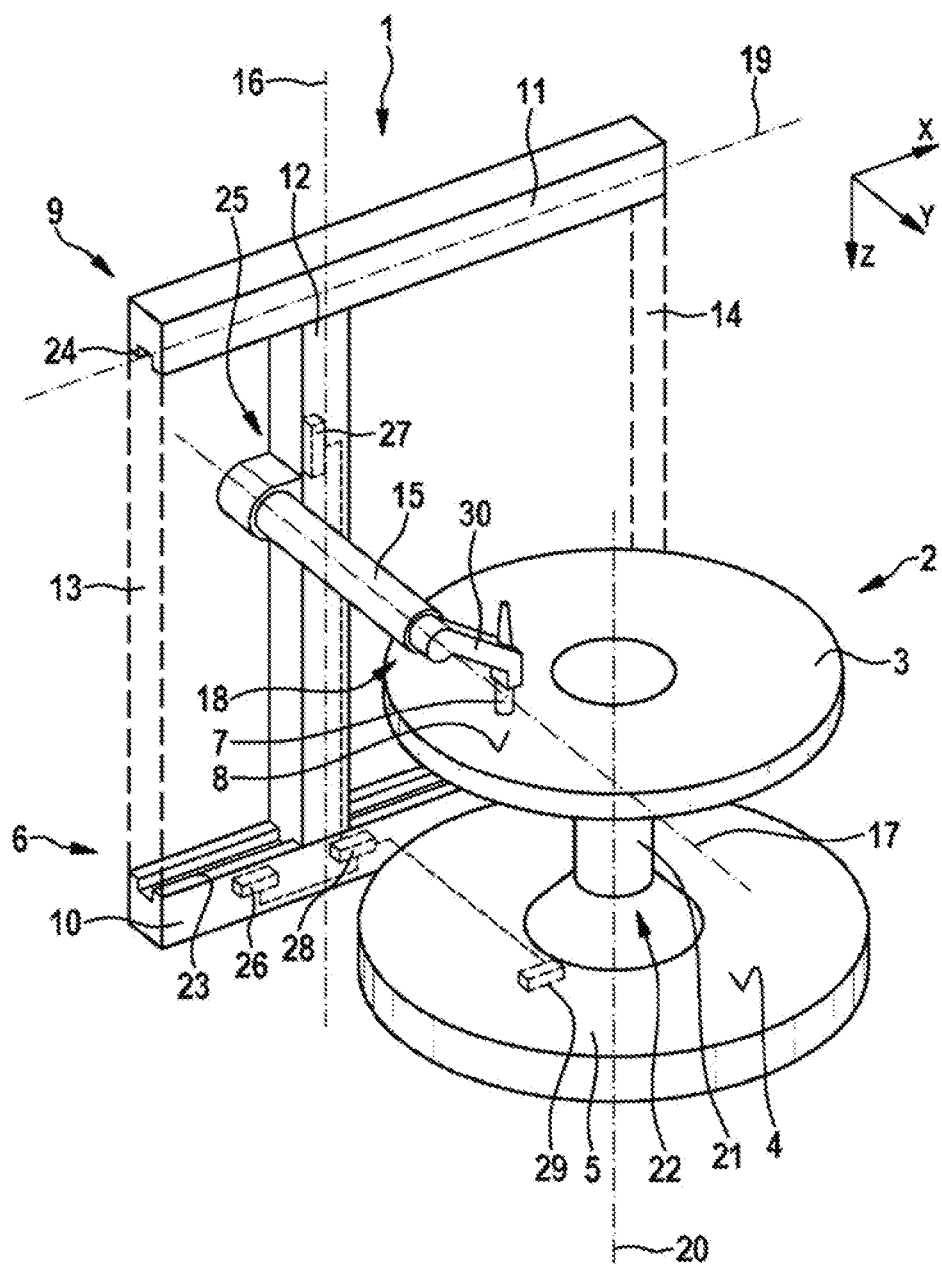
FIG. 1 shows a device for detecting the layer thickness of a coated component with a sensor in a first measuring position as a perspective representation.

FIG. 1 shows a device 1 for detecting the layer thickness of a coated component 2, in particular a brake disk 3 for a disk brake of a motor vehicle. The device 1 has at least one holding device 5 comprising a bearing surface 4 for the component 2 and a guiding device 6 for holding and guiding a sensor 7 for measuring the layer thickness, in the present case on an upper side 8 of the brake disk 3. The sensor 7 is preferably configured as a magnetic inductive measuring probe or as an eddy-current measuring probe.

The guiding device 6 preferably has a frame structure 9 with a lower bolt 10 and, optionally, an upper bolt 11. In addition, the guiding mechanism 6 comprises a support arm 12 with a substantially rod-shaped design movably mounted in particular on the lower bolt 10. Alternatively, the support arm 12 is movably mounted between the lower bolt 10 and the upper bolt 11, wherein the lower bolt 10 and the upper bolt 11 are preferably connected to one another by a first and second handle 13, 14.

The sensor 7 can be moved by the guiding device 6, particularly a guiding arm 15 arranged on the guiding device 6, in particular on the support arm 12 of the guiding device 6, along a vertical axis 16 depicted by a z-axis in the present case. The guiding arm 15 in the present case is arranged coaxially to a first axis of rotation 17, wherein the sensor 7 is arranged at a free end 18 of the guiding arm 15 in such a manner that its measuring direction is oriented at least substantially perpendicularly to the first axis of rotation 17.

The sensor 7 can also be moved by the guiding device 6, in particular the support arm 12, along a horizontal axis 19, represented by an x-axis in the present case.

Furthermore, the sensor 7 is pivotable about the first axis of rotation 17. The horizontal orientation of the first axis of rotation 17 in the present case corresponds to an orientation along a y-axis as depicted.

The bearing surface 4 of the holding device 5 is rotatable about a second axis of rotation 20 which is preferably arranged parallel to the vertical axis 16.

In the present case, the holding device 5 is arranged spaced apart from the guiding device 6. Alternatively, the holding device 5 is configured integrally with the guiding device 6. The holding device 5 is, in particular, a measuring table, the component 2 or the brake disk 3 preferably being capable of being placed directly on the bearing surface 4 of the holding device 5. In the present case, the holding device 5 has a spacer element 21 that is connectable/connected to the holding device 5, which spacer element is configured to receive the component 2 and hold said component 2 at a predefinable distance from the bearing surface 4. The spacer element 21 is preferably configured as a rod which is preferably mounted/mountable in a rotatable manner in the holding device 5. In order to receive the spacer element 21 in a secure manner, the holding device 5 has at least one, preferably conical, spacer element receiving means 22 which extends along the second axis of rotation 20. The spacer element receiving means 22 is preferably configured integrally with the bearing surface 4.

The guiding device 6 preferably has at least one guide rail 23, 24 which defines the horizontal axis 19. In the present case, the guiding device 6 has a first guide rail 23 assigned to the lower bolt 10. Optionally, a second guide rail 24 is assigned to the upper bolt 11. The guiding device 6, in particular the support arm 12, preferably has a further guide rail 25 which defines the vertical axis 16. The guiding device 6, in particular the support arm 12, is preferably mounted movably on the first guide rail 23 by means of rollers. The guiding arm 15 is likewise preferably movably mounted on the further guide rail 25 by means of rollers.

In the present case, the guiding device 6 has a first controllable actuator 26 for moving and a second controllable actuator 27 for turning the sensor 7. The actuators 26, 27 are preferably each configured as electric motors. The first actuator 26 is preferably electrically connected to a linear drive not shown here for the horizontal displacement of the support arm 12 and vertical displacement of the guiding arm 15, and the second actuator 27 is preferably connected to a first rotational drive not depicted here for pivoting the sensor 7. The linear drive and/or the first rotational drive are each configured as belt drives, for example. In order to control the actuators 26, 27, the device 1 preferably has a control unit 28 which is electrically connected/connectable in each case to the first and second actuator 26, 27.

The holding device 5 preferably has at least one further controllable actuator 29 for rotating the bearing surface 4. The further actuator 29 is likewise preferably configured as an electric motor and electrically connected to a second rotational drive not depicted here which is likewise configured as a belt drive. The other actuator 29 is preferably likewise electrically connected to the control unit 28. The control unit 28 preferably has a data storage unit not depicted here, in which predefinable measuring positions or coordinates of measuring positions are stored, for example, and which are conveyed to the actuators 26, 27, 29, in order to position or align the sensor 7 and the brake disk 3 in line with the coordinates.

Positioning of the component 2 or the brake disk 3 by means of a distance detection sensor, for example, which is preferably arranged/can be arranged on the guiding arm 18 preferably takes place before a layer thickness is measured, so that the layer thickness measurement can then be reliably carried out.

The sensor 7 is preferably fastened to a receiving means 30 which is arranged in the free end 18. Alternatively, the sensor 7 is fastened directly in the free end 18.

The device 1 preferably has a height in the vertical direction of 500 mm, in particular, and a width in the horizontal direction of 800 mm, in particular. The guiding arm 15 preferably has a length of 300 mm, in particular.

Figure 2:
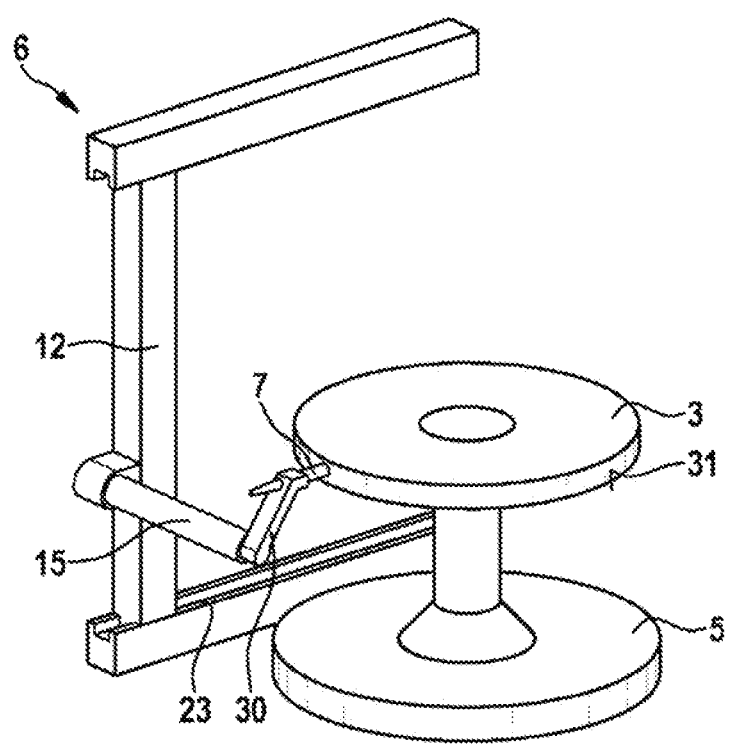
FIG. 2 shows the sensor in a second measuring position.

FIG. 2 shows the device 1, wherein the sensor 7, unlike in FIG. 1, detects the layer thickness at a side wall, in particular an outer casing wall 31 of the disk brake 3. Through corresponding control of the first actuator 26, the support arm 12 has been moved horizontally and the guiding arm 15 vertically in this case. Through control of the second actuator 27, the sensor 7 is rotated about the first axis of rotation 17.

Figure 3:
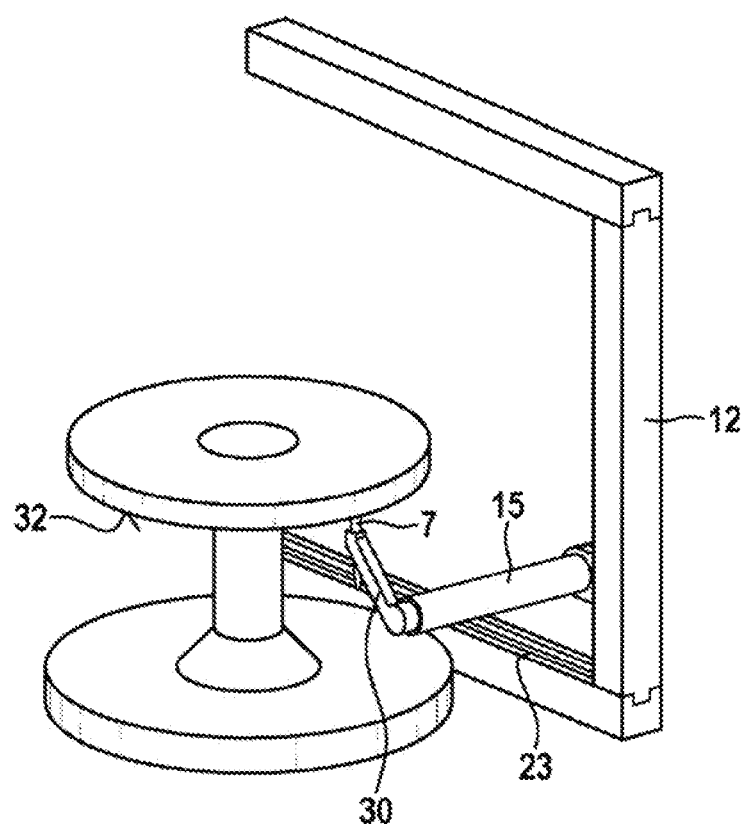
FIG. 3 shows the sensor in a third measuring position.

FIG. 3 shows the device 1, wherein by comparison with the previous figures, a lower side 32 of the brake disk 3 is now detected by the sensor 7 for the layer thickness measurement.

Figure 4:
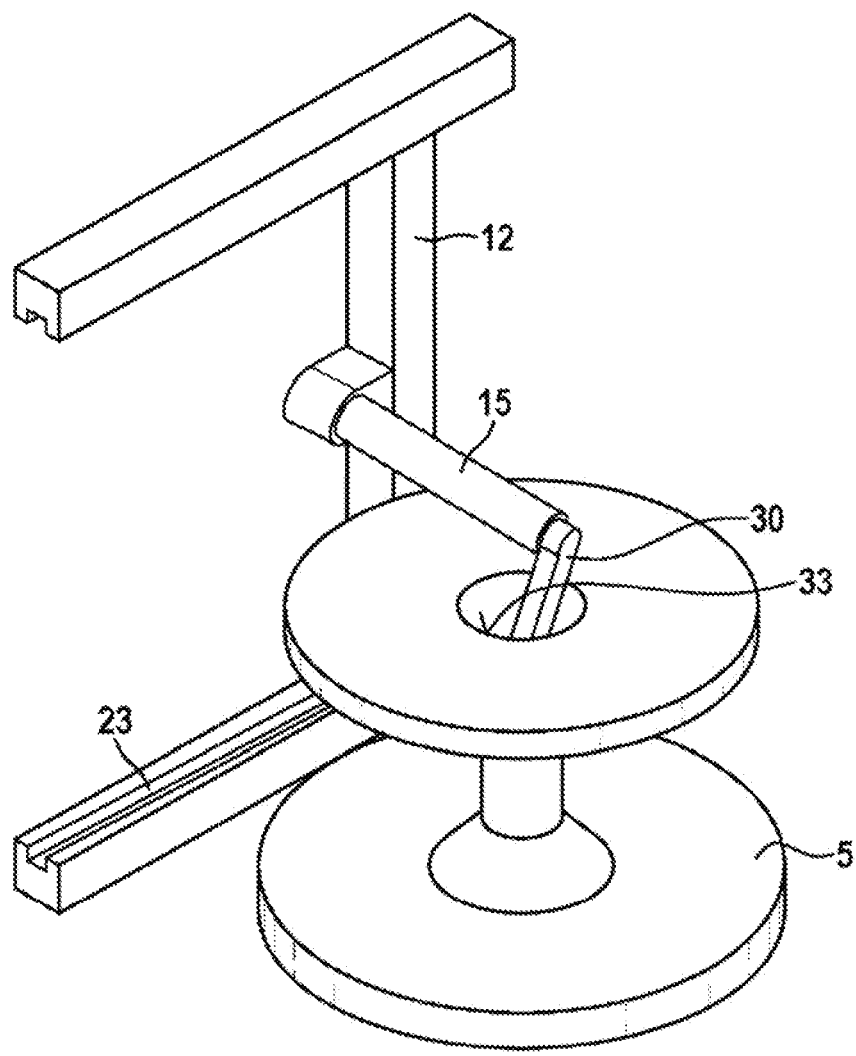
FIG. 4 shows the sensor in a fourth measuring position.

FIG. 4 shows the device 1, wherein the sensor 7 detects a pot casing surface or an inner casing wall 33 of the disk brake 3.

For increased clarity, some of the elements known from FIG. 1 are not drawn into FIGS. 2, 3 and 4.

An upper side 8, lower side 32, and side walls, in particular an outer casing wall 31 and inner casing wall 33, of the disk brake 3 can be detected by the device 1. Consequently, the brake disk 3 can, in particular, be detected at all relevant points with a single set-up, so including a wheel rim bearing surface, a hub bearing surface, a pot casing surface, and/or a tower casing surface. In particular, the combination of the automatic positioning of the sensor 7 and the automatic rotation of the bearing surface 4 guarantees the practicability of a particularly reliable, repeatable and completely automated layer thickness measurement. In particular, all relevant surfaces of the brake disk 3 can be controlled and measured without manual intermediate steps. The device 1 in this case is configured as a stand-alone measuring unit or as a separate device 1, however it may also be included on a production line. Through the set-up of the device 1, it is possible for a measuring time to be reduced, workload for a user and also user influence to be minimized, and repeat accuracy of the layer thickness measurement to be improved.

The device 1 preferably has a housing which surrounds or encloses the device 1 at least in part.

Coatings are organic paints or zinc-containing, liquid media, for example, which are intended to protect the brake disk 3 from corrosion. Layer thicknesses of other coatings such as thermally injected layers, for example, can also be measured using the device 1.

The invention claimed is:

1. A device for detecting a layer thickness of a coated component, comprising:
    at least one holding device having a horizontal bearing surface configured to support the coated component; and
    a guiding device configured to hold and guide a sensor to measure the layer thickness,
    wherein the guiding device is configured to move the sensor along a vertical axis, and the sensor is configured to pivot about a first axis of rotation that is oriented horizontally,
    the guiding device is further configured to move the sensor along a horizontal axis, and
    the sensor is arranged at a free end of a guiding arm, the guiding arm arranged coaxially with the first axis of rotation, the guiding device comprising:
    a rail having a main extent parallel to the horizontal axis; and
    a support arm having a main extent parallel to the vertical axis and configured to move along the rail in a direction parallel to the horizontal axis, wherein
    the guiding arm is supported by the rail through the support arm and configured to move along the support arm in a direction parallel to the vertical axis, the guiding arm extending from a first end portion of the guiding arm movably connected to the support arm to the free end portion opposite the first end portion, the free end portion at a fixed distance away from the support arm, wherein the sensor is rotatably mounted to the free end portion.

2. The device as claimed in claim 1, wherein the bearing surface of the holding device is configured to be rotated about a second axis of rotation that is oriented vertically.

3. The device as claimed in claim 1, wherein the guiding device has at least one controllable actuator configured to one or more of move and tune the sensor.

4. The device as claimed in claim 1, wherein the guiding device has at least one guide rail that defines the horizontal axis.

5. The device as claimed in claim 1, wherein the holding device has at least one controllable actuator configured to rotate the bearing surface.

6. The device as claimed in claim 1, wherein the sensor is configured as a magnetic inductive measuring probe or as an eddy-current measuring probe.

7. The device as claimed in claim 1, wherein the sensor is arranged at the free end of a guiding arm such that a measuring direction of the sensor is oriented at least substantially perpendicularly to the first axis of rotation.

8. The device as claimed in claim 1, wherein the component is configured as a brake disk for a disk brake of a motor vehicle.

9. A method for operating a device for detecting a layer thickness of a coated component, the device including at least one holding device that has a horizontal bearing surface for the coated component and a guiding device configured to hold and guide a sensor to measure the layer thickness, the method comprising:

supporting the coated component with the horizontal bearing surface;

moving the sensor with the guiding device along a vertical axis and pivoting the sensor about a first axis of rotation that is oriented horizontally with the coated component supported by the horizontal bearing surface, the first axis of rotation coaxial with a guiding arm, of the device, at a free end of which the sensor is arranged; and moving the sensor with the guiding device along a horizontal axis, wherein:

the guiding arm is supported with a rail having a main extent parallel to the horizontal axis, the rail supporting the guiding arm through a support arm having a main extent parallel to the vertical axis and configured to move along the rail in a direction parallel to the horizontal axis;

the sensor is rotatably mounted to the free end;

the free end is opposite a first end portion of the guiding arm;

the first end portion is movably connected to the support arm; and the free end portion is at a fixed distance away from the support arm.

10. The method as claimed in claim 9, wherein the component is configured as a brake disk for a disk brake of a motor vehicle.

11. A device for detecting a layer thickness of a coated component, comprising:

at least one holding device having a horizontal bearing surface configured to support the component; and a guiding device configured to hold and guide a sensor to measure the layer thickness, wherein the guiding device is configured to move the sensor with respect to the at least one holding device along a horizontal axis and along a vertical axis, and pivot the sensor about a first axis of rotation that is oriented horizontally, and the horizontal bearing surface of the at least one holding device is configured to rotate about a second axis of rotation that is oriented vertically, wherein the guiding device comprises:

a rail having a main extent parallel to the horizontal axis;

a support arm having a main extent parallel to the vertical axis and configured to move along the rail in a direction parallel to the horizontal axis; and a guiding arm having a main extent parallel to the horizontal axis and supported by the rail through the support arm, the guiding arm configured to move along the support arm in a direction parallel to the vertical axis, the guiding arm including a first end portion and a second end portion opposite the first end portion, the first end portion movably connected to the support arm and the second end portion at a fixed distance away from the support arm, wherein the sensor is rotatably mounted to the free end portion.

12. The device as claimed in claim 11, wherein the first axis of rotation is movable with respect to the second axis of rotation.

13. The device as claimed in claim 2, wherein the first axis of rotation is movable with respect to the second axis of rotation.

* * * * *